United States Patent
Korovkin et al.

(10) Patent No.: US 12,183,471 B2
(45) Date of Patent: Dec. 31, 2024

(54) SINGLE-LOOP NUCLEAR POWER PLANT WITH PRESSURIZED COOLANT

(71) Applicants: JOINT STOCK COMPANY ENGINEERING COMPANY ASE, Nizhniy Novgorod (RU); JOINT STOCK COMPANY ATOMENERGOPROEKT, Moscow (RU)

(72) Inventors: Sergey Viktorovich Korovkin, Dolgoprudniy Moscovskaya (RU); Evgeniya Viktorovna Tutunina, Moscow (RU)

(73) Assignees: JOINT STOCK COMPANY ENGINEERING COMPANY ASE, Nizhniy Novgorod (RU); JOINT STOCK COMPANY ATOMENERGOPROEKT, Moscow (RU)

(*) Notice: Subject to any disclaimer, the term of this patent is extended or adjusted under 35 U.S.C. 154(b) by 0 days.

(21) Appl. No.: 16/981,657

(22) PCT Filed: Dec. 29, 2017

(86) PCT No.: PCT/RU2017/001009
§ 371 (c)(1),
(2) Date: Sep. 16, 2020

(87) PCT Pub. No.: WO2018/222077
PCT Pub. Date: Dec. 6, 2018

(65) Prior Publication Data
US 2021/0098141 A1    Apr. 1, 2021

(30) Foreign Application Priority Data

Jun. 2, 2017 (RU) .................. 2017119435

(51) Int. Cl.
*G21C 1/08* (2006.01)
*G21C 15/243* (2006.01)
*G21D 1/00* (2006.01)

(52) U.S. Cl.
CPC ........... *G21C 1/086* (2013.01); *G21C 15/243* (2013.01); *G21D 1/006* (2013.01)

(58) Field of Classification Search
CPC ............ G21D 1/02; G21D 1/04; G21D 1/006; G21D 5/06; G21D 1/086; G21C 1/086;
(Continued)

(56) References Cited

U.S. PATENT DOCUMENTS 2,825,688 A * 3/1958 Harcourt .................. G21D 5/06
                                                     976/DIG. 30
3,509,857 A * 5/1970 Dillstrom .................. F22G 5/12
                                                     976/DIG. 19
(Continued)

FOREIGN PATENT DOCUMENTS

| CA | 2481522 A1 * | 4/2006 | ............... G21D 1/02 |
| EP | 0344094 A1 * | 11/1989 | ............... F22B 3/04 |
| FR | 2644084 A1 * | 9/1990 | ............... B04C 3/06 |
| RU | 2493482 C2 * | 9/2013 | |

OTHER PUBLICATIONS

Korovkin, S. V. "Single-loop nuclear power plant with a pressurized-water reactor." Soviet Atomic Energy 71.5 (1991): 940-942. (Year: 1991).*

*Primary Examiner* — Sharon M Davis
(74) *Attorney, Agent, or Firm* — J. Miguel Hernandez; James R. Gourley; Carstens, Allen & Gourley, LLP

(57) ABSTRACT

Single-loop nuclear power plant with a pressurized coolant, comprising a power generating unit and a throttling device having an impeller, which are interconnected by an outlet pipe and a feed pipe, and a steam turbine connected to the throttling device and to a condenser connected to the throttling device, vertically divided into a steam zone, a high (Continued)

pressure zone, and a low pressure zone by horizontal partitions. The high pressure zone is connected to the the feed pipe and is connected to the low pressure zone by throttling nozzles provided in the partition between said zones, and the low pressure zone is connected to the steam zone by a vertical pipe which passes through the horizontal sealed partitions and the high pressure zone. The single-loop nuclear power plant is provided with an electric motor to rotate the impeller.

3 Claims, 2 Drawing Sheets

(58) Field of Classification Search
CPC .......... G21C 1/028; G21C 15/25; G21C 1/04; G21C 15/243; G21C 15/26; G21C 1/08; G21C 1/082; F22B 37/002; F22B 37/32; F22B 37/325; F22B 37/74; F22B 37/26; F22B 37/327; F22B 3/04; F22B 3/045; F22D 7/06; F22D 1/30; F22D 1/28; B01D 45/14; B04B 1/04

See application file for complete search history.

(56) References Cited

U.S. PATENT DOCUMENTS

| | | | | |
|---|---|---|---|---|
| 4,038,134 | A | * 7/1977 | Dorner | G21C 11/088 376/293 |
| 4,407,127 | A | * 10/1983 | Shiraki | F22B 3/04 203/40 |
| 2008/0236616 | A1 | * 10/2008 | Bloch | F16L 57/06 134/2 |
| 2008/0250765 | A1 | * 10/2008 | Lane | B01D 45/06 55/495 |
| 2013/0322588 | A1 | * 12/2013 | Sekimoto | G21C 3/16 376/213 |

* cited by examiner

A-A

B-B

SINGLE-LOOP NUCLEAR POWER PLANT WITH PRESSURIZED COOLANT

CROSS-REFERENCE TO RELATED APPLICATIONS

This application is a U.S. 371 application from PCT/RU2017/001009 filed Dec. 29, 2017 entitled Single-Loop Nuclear Power Plant with Pressurized Coolant, published as WO 2018/222077 on Dec. 6, 2018, which claims priority to Russian Application No. 2017119435 filed Jun. 2, 2017. The technical disclosure of each patent application and publication listed in this paragraph is hereby incorporated herein by reference, as an example.

FIELD OF THE INVENTION

The invention relates to nuclear engineering, in particular to nuclear power stations (NPS) and can be used for the generation of electric power.

BACKGROUND OF THE INVENTION

An integral part of modern NPS is a complex of mechanisms, devices and systems designed to obtain heat in the nuclear reactor and convert it to the energy of steam delivered to consumers or to a turbine producing electricity. It is obvious that an increase in the efficiency of the use of the nuclear fuel in the nuclear power station can be achieved by the organization of this complex, called steam-generating nuclear plant (SGNP). Several types of NPS with different SGNPs are known at present.

There is known a single-loop technological scheme of an NPS including the SGNP, a steam turbine and a condenser, in which the SGNP is a nuclear reactor with an active zone located therein, water supply branch pipes and branch pipes for recovering steam. In the active zone of the reactor takes place the heating of water up to its saturation temperature, the boiling of water and the steam generation. The vapor from the reactor is fed to a steam turbine generating electric power. The spent steam from the turbine is condensed in a condenser, and the resulting water is returned to the reactor by feed pumps. The disadvantage of this type of SGNP is that the presence of steam in the active zone leads to an increase in the size of the reactor and the formation of scale on the heat-recovering elements, a complication of the reactor control system, a non-uniformity of the neutron field, what leads to a reduction in the efficiency of the use of the nuclear fuel [1].

A two-loop technological scheme of an NPS is known, which comprises an SGNP, a steam turbine and a condenser, in which the SGNP is a nuclear reactor with steam generators additionally introduced into it and, in the first loop, a combination of a system of circulation pipelines and circulation pumps, through which hot water is circulated under a pressure which does not allow its boiling. In the active zone, the water is heated and enters a steam generator where the heat is transferred through heat exchange surfaces to the water of a second loop, which is under saturation pressure and boils. Steam formed thereby is fed to a steam turbine. The spent steam from the turbine is condensed in a condenser and the resulting water is returned to the steam generators by feed pumps. The translocation of the boiling zone into separate steam generators allows a reduction of the overall dimensions of the reactor, improved thermal-hydraulic and neutron-physical parameters of the active zone, simplified control of the reactor. At the same time, the disadvantage of this solution is that it results in the formation of scale on the heat transfer surfaces of the steam generators, what makes SGNP complicated and expensive, since the steam generators are large-sized and expensive apparatuses which results in a reduction of the efficiency of the use of nuclear fuel [1].

In both of the above-mentioned technological NPS schemes, steam is generated by boiling water on the surface of a heat exchanger, which results in the formation of scale on the heat recovering and heat transferring elements.

In order to remedy this drawback, there has been proposed a technological scheme of a single-loop NPS disclosed in [2] with reference to Inventor's Certificate USSR N ° 286612 from Feb. 1, 1989, in which in the technological scheme of a single-loop NPS a pressurized water reactor and a throttle device connected to the reactor by means of feeding and discharge lines are used, which employs a two-phase hydraulic turbine drive of the impeller of the main circulation pump (MCP), a steam turbine and a condenser connected by pipelines to the throttling device, as well as a pressure compensator and a feed pump for the supply of feed water from the condenser to the throttling device. In a single-loop NPS according to such a scheme, the generation of steam is carried out by throttling the hot water to a pressure below the boiling point in the first hydraulic turbine of the steam generating plant, rather than boiling water on the heating surface. When the flow of hot water is throttled below the saturation temperature, a portion of the hot water is converted to steam, whereby the two-phase stream, which is a mixture of steam and water, increases its velocity. At the same time the power generation is also carried out by the two-phase hydraulic turbine by rotating it. Formed steam is separated from water under the action of centrifugal and gravitational forces and is fed to a steam turbine. The spent steam from the turbine is condensed in a condenser, and the resulting water is returned by the feed pump to the two-phase hydraulic turbine driving the impeller of the MCP, returning the feed water to the reactor through the supply pipeline. Such a method of steam generation eliminates the heat transfer surfaces from the technological scheme, where the steam generation takes place, thereby preventing steam generation in the active zone of nuclear reactor, and replaces bulky and expensive steam generators by compact and cheap throttling devices, what allows it reduce the overall dimensions and the cost of the steam generating nuclear plant.

A disadvantage of an NPS in which the SGNP is provided with said throttle device for steam generation is the complexity of the start of the NPS and the complexity of ensuring a stable operation at changes of power due to the presence of positive feedback between the power of the two-phase hydraulic turbine and the power of the MCP, the impeller of which is driven by the two-phase hydraulic turbine. Under insufficient pressure of steam entering the two-phase hydraulic turbine through the outlet pipe, the power thereof becomes insufficient for the rotation of the impeller of the MCP, which leads to an insufficient supply of the feed water to the reactor and then to a drop of the pressure of the steam in the discharge pipe, which may further result in an uncontrolled acceleration of the reactor and even its explosion. In order to partially remedy this drawback, in such a single-loop NPS a pressure compensator is used connected to the discharge line between the reactor and the two-phase hydraulic turbine, which contains a supply of feed water and a heating device and is configured to supply steam to the two-phase hydraulic turbine in the start-up modes of the nuclear power station and when the steam pressure drops in the discharge line. However, the introduction of the pressure compensator complicates the NPS, leads to insufficient efficiency of the use of the nuclear fuel and, in addition, fails to provide the required safety of operation of the single-loop NPS.

DISCLOSURE OF THE INVENTION

The object of the present invention is to develop a single-loop NPS with an increased efficiency of the nuclear fuel utilization and an increased reliability and safety in operation in all modes. The technical result of the present invention is to increase the efficiency of the use of nuclear fuel in a single-loop NPS with a heat-carrier under pressure and to increase the reliability and safety in its operation in all modes.

The technical result is achieved by the fact that in a known single-loop nuclear power station with a heat-carrier under pressure, including a power unit and a throttling device which are connected by means of an output pipeline and a feed pipeline, a steam turbine, which is connected by means of pipes to the throttling device and to a condenser, which is also connected to the throttling device, also is included an electric drive which is connected to a impeller and configured to rotate it, and a throttling device which is vertically separated into a steam zone, a zone of high pressure and a zone of low pressure, which zones are separated by horizontal partitions, the steam zone being located higher than the zone of high pressure, which in turn is located higher than the zone of low pressure, the zone of high pressure being connected to thean inlet of the output pipeline and being connected to the zone of low pressure by means of throttling nozzles, which are arranged in a horizontal partition between said zones at a periphery of the horizontal partition at an inclination to a vertical line, the zone of low pressure being connected to the steam space-zone by means of a vertical pipeline which passes through the centers of the horizontal meste-partitions and the zone of high pressure.

Preferably, the electric motor is connected to the steam turbine.

It is expedient to provide an atomic power station with a heat-carrier under pressure with a redundant diesel generator connected to the electric motor and capable of supplying power to the electric drive.

It is recommended to provide the pipeline connecting the throttling device and the steam turbine with a steam control valve with the possibility of adjusting and shutting off the steam flow.

It is preferred to provide the pipeline connecting the condenser and the throttling device with a feed pump.

The advantages of the present invention are an increase in the efficiency of the use of nuclear fuel in the NPS with a heat-carrier under pressure and an increase in reliability and safety of its operation in all modes. A throttling device being divided into a steam zone, a high pressure zone and a low pressure zone separated by horizontal partitions, and the steam zone being located above the high-pressure zone, which is located above the low pressure zone, the high-pressure zone being connected to an inlet of the output pipe-line and also connected to the low pressure zone by throttling nozzles made in the partition between these zones on the periphery thereof at an inclination to the vertical line, the zone of the low pressure being connected to the steam zone by a vertical pipeline passing through the centers of the horizontal partitions and the high-pressure zone which makes it possible to separate the steam-gas mixture under pressure into steam and water without deposit of scale and with utilization of the water energy in throttling openings, makes it possible to increase the efficiency of the nuclear fuel in the NPS with a heat-carrier under pressure by using the energy of motion of the water exiting the throttle nozzles and by using centrifugal forces for additionally separating the steam-gas mixture into steam and gas, which also makes it possible to increase the reliability and safety of operation of the single-loop NPS with a heat carrier under pressure in all modes of operation. The provision of a single-loop NPS with a heat carrier under pressure with an electric drive arranged with the possibility of rotating the impeller makes it possible to increase the efficiency of the use of nuclear fuel in the NPS with a heat carrier (heat transfer medium) under pressure due to the addition of the energy of the streams of water flowing out of the throttle nozzles and the rotation energy of the impeller, also makes it possible to ensure the reliability and safety of its operation in all modes due to provision of independence of operation of the impeller from pressure in the discharge pipeline, which makes it possible to start the reactor by means of the power of the electric motor, and also eliminates the acceleration of the power of the reactor caused by the deficiency of the heat carrier.

BRIEF DESCRIPTION OF THE DRAWINGS

FIG. 2 illustrates cross-section A-A depicting the throttle nozzles of FIG. 1. FIG. 3 illustrates a vertical section B-B depicting a throttle nozzle of FIG. 2.

REALIZATION OF THE INVENTION

Figure 1:
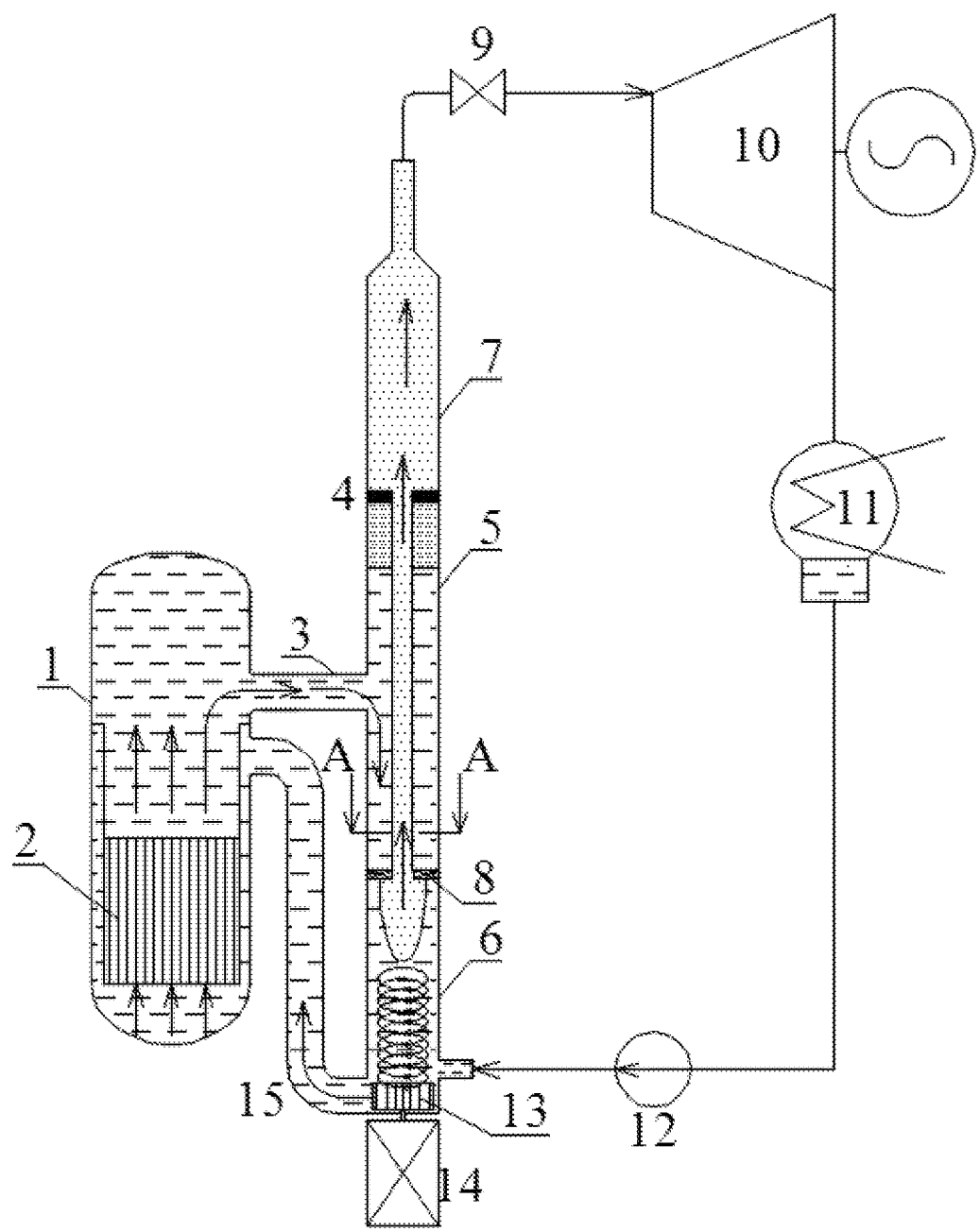
FIGS. 1-3 illustrate a schematic representation of the construction of a single-loop nuclear power station in a preferred embodiment, comprising a power unit made in the form of a nuclear reactor 1 with an active zone 2 connected by means of a discharge pipe 3 and a supply line 15 with a throttling device 4 with an impeller 13, divided into a high-pressure zone 5, a zone of low pressure 6 and a steam zone 7, which are separated by horizontal partitions, at the periphery of the horizontal partition dividing the high-pressure zone 5 and the low-pressure zone 6, there are provided at an inclination to the vertical throttle nozzles 8, the high-pressure zone being connected to the inlet of the discharge pipe 3, the low-pressure zone 6 being connected to the steam zone 7 by a vertical pipeline passing through the centers of the horizontal partitions and the high-pressure zone. The single-loop atomic power plant is provided with an electric drive 14 of the main circulation pump capable of rotating the impeller 13, with a steam control valve 9 located in the pipe connecting the throttling device 4 and a steam turbine 10 which in turn is connected by a pipeline with a condenser 11 connected in turn with a pipeline on which the feed pump 12 is mounted, with a throttling device 4.
Figure 2:
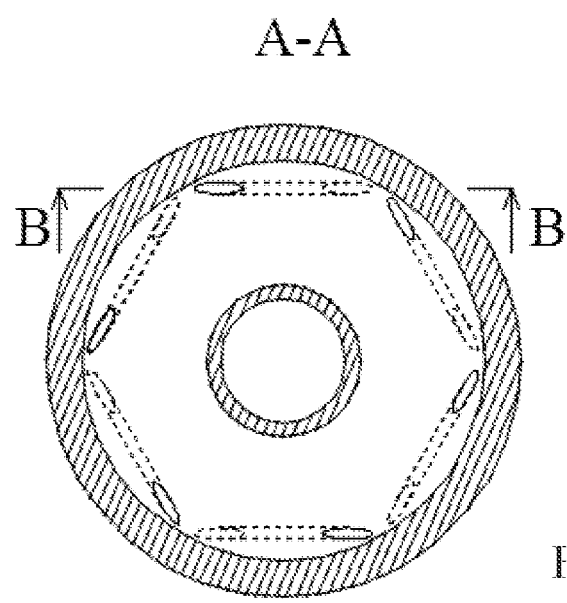
Figure 3:
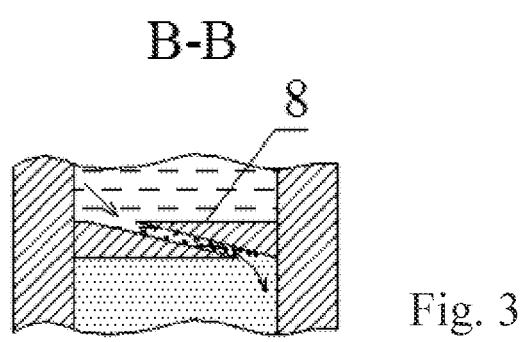

The single-loop atomic power station of the present invention preferably operates as follows.

The pressurized water is pumped through the active zone 2, which is in the housing of the nuclear reactor 1, which is heated and fed via the discharge line 3 of the reactor 1 to the throttling device 4 consisting of the high-pressure zone 5, the zone of low pressure 6 and the steam zone volume 7. High-pressure zone 5 and low pressure zone 6 are separated by a horizontal partition with throttle nozzles 8 installed in it and made for a reduction of the pressure and an acceleration of hot water flow. In the throttle nozzles 8, the pressure of the hot water drops below the saturation pressure, so that the hot water boils and the resulting two-phase stream is accelerated. The throttle nozzles 8 are inclined to the vertical in such a way that the two-phase flow is twisted around the axis of the throttling device 4. Due to the centrifugal force, the water in the low-pressure zone 6 is thrown to the walls of the throttling device 4, and steam is passed through vertical pipeline into steam zone 7, from which it enters a steam turbine 10 through steam regulating valve 9, the rotor of which is connected to the rotor of electric generator. Spent steam used in steam turbine 10 is condensed in condenser 11 and the condensed water by a pump of feed water 12 is supplied to the throttling device 4 to the impeller 13 of the circulation pump, which is driven by the electric drive 14 receiving electric power from the steam turbine 10. Further, the water flow consisting of the separated rotating water of the low-pressure zone and the feed water by the impeller 13 is fed through the supply branch pipe 15 into the nuclear reactor again, whereby the pressure of the water is increased to the pressure in the reactor 1 due to the kinetic energy of the rotating water and the rotation of the impeller 13. The conversion of the kinetic energy of the rotating water into the potential energy of pressure makes it possible to considerably reduce the consumption of electric power by the circulating pump for increasing the pressure of the water flow.

The electric drive 14 operates as follows: in normal operation, it receives electric power from the rotor of the electric generator which is connected to the rotor of the steam turbine, in the emergency mode it is possible to supply the electric drive 14 from the backup diesel generators of the NPS, when the NPS is started, the electric motor 14 can receive electric power from an industrial network, diesel generators, or any other external source. These possibilities, distinguishing the present invention from [2], provide an increase in the reliability and safety of operation of a single-loop nuclear power station with a heat transfer medium under pressure in all modes.

The steam control valve 9 may be used in the start-up mode of the NPS. For this, during start-up, the steam control valve 9 is closed to provide sufficient steam pressure, whereupon the opening of the steam control valve 9 causes the steam turbine 10 to be started.

The calculations show that at the water parameters at the outlet of the reactor and the parameters of the steam at the turbine inlet similar to those of the NPS with the reactor VVER-1000, the consumption of electric power to the drive of the impeller 13 will be no more than 3% of that produced by the steam turbine 10, which is similar to the power consumption of the main circulation pumps at the double-loop nuclear power station with the reactor VVER-1100.

The essence of the claimed invention is not limited to the above-described versions. Skilled persons of the relevant technical field can supplement it with additional embodiments.

INDUSTRIAL APPLICABILITY

The single-loop nuclear power station with a heat carrier under pressure provides high efficiency of the use of nuclear fuel, as well as reliability and safety of its operation in all modes and can be used in nuclear power engineering.

The invention claimed is:

1. A single-loop nuclear power plant with a heat-carrier under pressure, comprising:
   nuclear reactor comprising a reactor core and containing the heat carrier under pressure;
   a throttle steam generator, the nuclear reactor and the throttle steam generator connected by a discharge line and the a supply line;
   a steam turbine connected to the throttle steam generator by a steam turbine inlet pipeline;
   a condenser connected to the steam turbine by a steam turbine outlet pipeline and to the throttle steam generator by;
   a condenser outlet pipeline; and
   an impeller disposed in the throttle steam generator and connected to an electric drive configured to rotate the impeller;
   wherein the throttle steam generator is a cylinder having a vertical axis and comprises:
   a topmost steam zone;
   a high pressure zone disposed below the steam zone and connected to the discharge line;
   a low pressure zone disposed below the high pressure zone and connected to the supply line;
   a horizontal partition separating the high pressure zone from the low pressure zone, the horizontal partition having throttling nozzles arranged therein, the throttling nozzles passing through the horizontal partition at an inclination between horizontal and vertical; and
   a coaxial vertical pipeline connecting the low pressure zone with the steam zone passing through the horizontal partition and the high pressure zone;
   wherein the throttling nozzles connect the high pressure zone to the low pressure zone and are configured to reduce the pressure of and boil the heat carrier as it passes through the throttling nozzles from the high pressure zone to the low pressure zone,
   wherein the inclination of the throttle nozzles causes separation of the heat carrier into liquid and steam, the steam passing through the vertical pipeline to the steam zone and the steam turbine, and the liquid rotating around the vertical axis to the supply line and the reactor core.

2. The single-loop nuclear power plant with a heat carrier under pressure according to claim 1, further comprising a steam regulating valve arranged in the steam turbine inlet pipeline configured to regulate a stream of steam through the steam turbine inlet pipeline.

3. The single-loop nuclear power plant with a heat carrier under pressure according to claim 1, further comprising a feed pump arranged in the condenser outlet pipeline.

* * * * *